W. J. EARL.
STOVE-GRATE.

No. 172,718.  Patented Jan. 25, 1876.

Witnesses:
H. A. Daniels.
D. V. Cowl

Inventor:
William J. Earl
by J. S. K. Moss
Attorney.

UNITED STATES PATENT OFFICE.

WILLIAM J. EARL, OF ALBANY, NEW YORK, ASSIGNOR OF ONE-HALF HIS RIGHT TO CLARKSON TIBBITTS, OF SAME PLACE.

IMPROVEMENT IN STOVE-GRATES.

Specification forming part of Letters Patent No. 172,718, dated January 25, 1876; application filed January 12, 1876.

*To all whom it may concern:*

Be it known that I, WILLIAM J. EARL, of the city of Albany, in the county of Albany and State of New York, have invented certain new and useful Improvements in Grates for Coal-Stoves, &c.; and I do hereby declare that the following is a full, clear, and exact description thereof, which will enable others skilled in the art to which it appertains to make and use the same, reference being had to the accompanying drawings and to the letters of reference marked thereon, which form a part of this specification.

Figure 1:
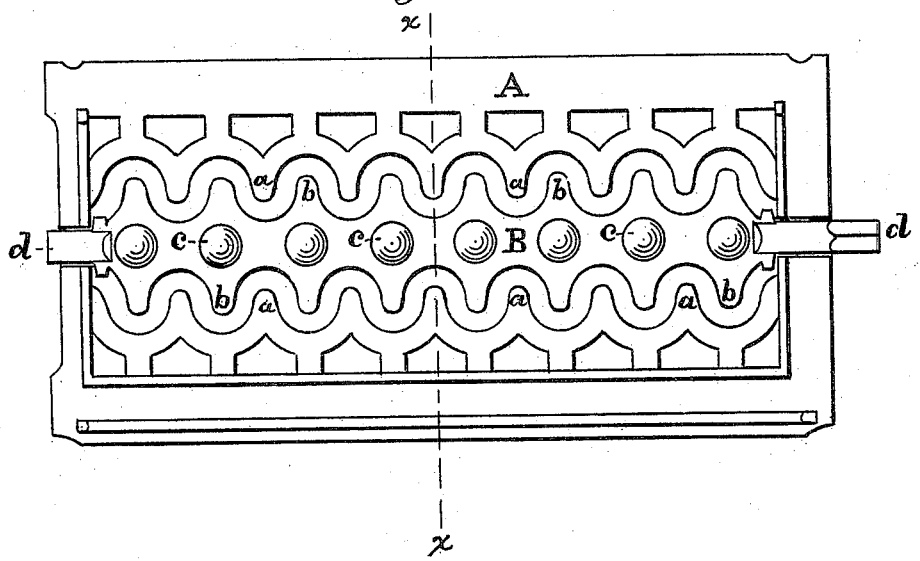
Figure 2:
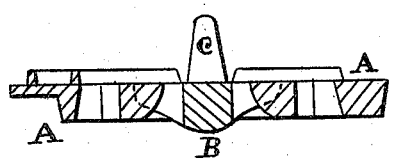
Figure 3:
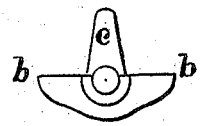

In the drawing referred to and forming a part of the specification herein, Figure 1 represents a plan view of my improved grate. Fig. 2 represents a section on the line $x\ x$ of Fig. 1. Fig. 3 is an end view of a removable part of the grate.

My improved grate is more especially adapted to coal-stoves and other constructions in which coal is burned. It is made in two parts, same being designated A and B in the drawing, the part A having a longitudinal opening along the center to receive the part B. Along both sides of the said opening the grate A is constructed with scallops, which form the tongues $a$, projecting inward, as shown in Fig. 1. The said grate has also, at each end and on a line with the center, a suitable bearing constructed, in which rests an arm formed at each end of the removable part B, when the grate is properly adjusted.

The revolving plate or removable part B is also constructed with scallops along both sides thereof, forming the projections or tongues $b$, extending outwardly and between the tongues $a$ of the grate A, as shown in the drawing. The said part B also has arms $d$ at the ends thereof, formed to rest in bearings in the grate A, one of said arms being shaped to receive a handle or crank for revolving the said plate B.

The revolving plate B is also provided with a row of projections or posts, $c$, made solid therewith and placed on a line along its upper center from end to end, as shown.

The said projections $c$ are intended for raking and dumping; also for breaking clinkers; and they should not be made so long as to prevent the revolving plate B being entirely turned over.

The said projections $c$ further serve, when the grate is in position and the coal rests against them, to keep the plate B in its proper level position.

Having described my invention, I claim—

The grate A, having the tongues $a$, and provided with the revolving plate B, having the tongues $b$ and projections $c$, constructed as shown, for the purposes set forth.

In testimony that I claim the foregoing as my own invention I affix my signature in presence of two witnesses.

WM. J. EARL.

Witnesses:
  A. AUGUSTUS PEEBLES,
  DUDLEY W. DE WITT.